INVENTORS:
SHERMAN C. HETH
SAHAG AKGULIAN
BY: KNUD H. HOFFMEYER
ATTORNEY

3,099,165
VEHICLE TRANSMISSION
Sherman C. Heth, Sahag C. Akgulian, and Knud H. Hoffmeyer, Racine, Wis., assignors to Jacobsen Manufacturing Co., Racine, Wis., a corporation of Wisconsin
Filed Feb. 27, 1961, Ser. No. 91,978
5 Claims. (Cl. 74—342)

This invention relates to a transmission, and more particularly, it relates to a variable speed transmission for a vehicle.

It is an object of this invention to provide a variable speed transmission which is an improvement over transmissions heretofore known, and especially, which is a simplification in transmissions from a structural standpoint while maintaining all of the functional features of a variable speed transmission. In the accomplishment of this object, one of the usual jack shafts is eliminated, and another one of the jack shafts has two clusters of separately rotatable gears mounted thereon.

Another object of this invention is to provide a compact transmission of the variable speed type for use in a vehicle such as a tractor or the like.

Still another object of this invention is to provide a combined transmission and differential of a compact type which can be readily enclosed in a single housing and which is therefore inexpensive and simple to manufacture but yet it is efficient and as completely functional as heretofore known transmissions and differentials combined.

Other objects and advantages will become apparent upon reading the following disclosure in light of the accompanying drawing wherein.

The same reference numerals refer to the same parts between the two views.

Figure 1:
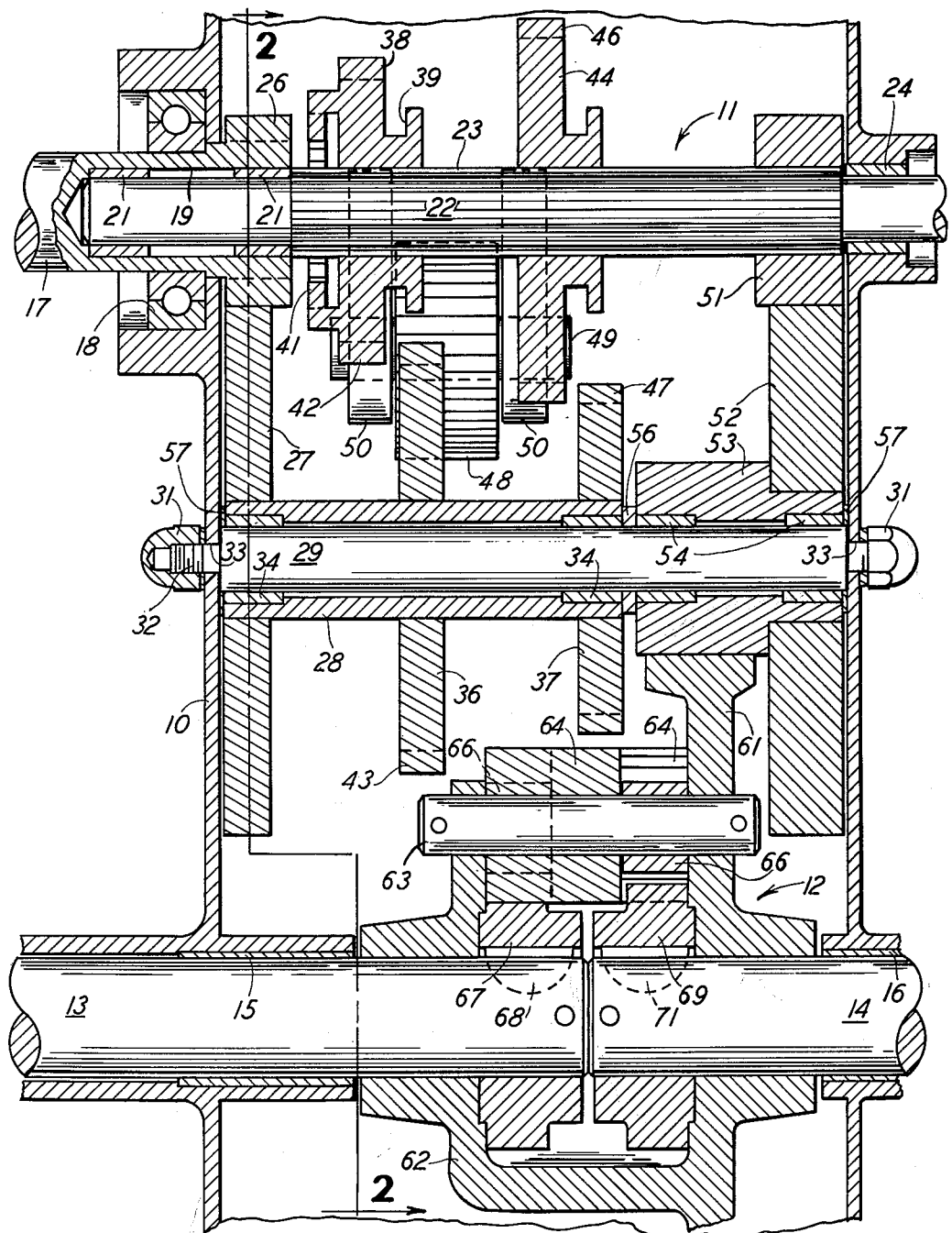
FIG. 1 is a sectional view of a transmission and differential made according to a preferred embodiment of this invention, and with the section taken on the line 1—1 of FIG. 2.

A preferred embodiment of this invention includes the housing 10 which encloses the transmission generally designated 11, and the differential is generally designated 12. In these drawings, it will be noted that for purposes of clarity and simplification, the gears and certain other parts of FIG. 1 are shown in sections, and the gears are shown in dot dash lines in FIG. 2 in order that the gear meshing can be readily seen and determined. It will be further understood that the transmission 11 and differential 12 are particularly useful in propelling a vehicle such as a tractor or the like, and thus the transmission and differential are enclosed in the same housing 10 with the two wheel axles 13 and 14 extending through respective bushings or bearings 15 and 16 supported in the housing 10 as shown.

The power input to the transmission is shown to be through a shaft 17 which is rotatably mounted in the housing 10 by means of a ball bearing or the like 18. For purposes of simplification, the particular gear or pulley which would normally be mounted on the shaft 17 is not shown since the shaft 17 is of course only fragmentarily shown, but it will of course be understood that shaft 17 serves as the input shaft receiving the power from an engine not shown. The shaft 17 is shown to have a central bore 19 which in turn supports bushings or bearings 21 which rotatably journal a shaft 22 having conventional splines 23 thereon. The splines 23 of course extend through the intermediate length of the shaft 22 in the conventional manner of any spline shaft which is used for supporting shift gears in a transmission. The opposite end of the shaft 22 is also rotatably supported in the housing 10 by means of a bushing or bearing 24.

A first reduction gear 26 is included in the shaft 17 to rotate therewith and to engage a larger gear 27 to rotate the latter in the usual manner while the latter is mounted on a sleeve or shaft 28. At this time it will also be noted that the sleeve 28 is cylindrical and journaled over a dead shaft 29 which is fixed to the housing by means of nuts 31 engaging the threaded ends 32 on the shaft 29 where these ends 32 extend through openings in the housing 10, and these openings are designated 33. In this manner the shaft 29 is non-rotatably mounted on the housing 10, but the telescoping sleeve 28 is rotatable over the shaft 29 by means of the bushings or bearings 34 disposed between the shaft 29 and the sleeve 28 at opposite ends of the latter as shown.

Thus the rotation of the gear 26 and its engagement with the gear 27 causes the latter to rotate as desired and to in turn rotate the sleeve 28 since the gear 27 is fixedly mounted on the sleeve 28 to transmit its rotation to the latter sleeve.

At this time, it will also be noted that a smaller gear 36, that is smaller with respect to gear 27, and a still smaller gear 37 are also fixedly mounted on the sleeve 28 to rotate with the latter. The gears 27, 36, and 37 constitute one gear cluster, all rotatable together with the sleeve 28. The shift gear 38 is slidably mounted on the spline shaft 22 to of course rotate therewith and to slide thereon in the conventional and well-known manner as the shift control lever (not shown) engages the usual circular recess 39 formed in the gear 38. Here it will also be understood that the gear 38 has gear teeth 41 formed thereon for engagement with the gear 26 for a high speed power transmission of rotation from the shaft 17 through the gear 26 and to the gear 38 and its spline shaft 22. Also the gear 38 has gear teeth 42 on the outer circumference thereof for engagement with the teeth 43 on the gear 36 and such engagement would constitute a second speed of rotation transmitted through the gears.

Another shift gear 44 is axially slidably mounted on the spline shaft 22 and it has gear teeth 46 thereon for engagement with the teeth 47 on the gear 37 when the gear 44 is shifted into alignment with the gear 47, all in the well-known and conventional manner of shifting and gear engaging. Such engagement would constitute a low speed transmission through the gear 26 and to the sleeve 28 and the gear 47 and back to the gear 44 for the desired speed of rotation of the shaft 22.

A reverse gear 48 is also rotatably mounted in the housing 10 on a shaft 49 which is supported on two spaced-apart arms 50 suitably mounted in the housing 10 in a fixed position. Thus the reversing gear 48 is in constant engagement with the gear 36, and the gear 44 can be shifted into engagement with the gear 48 for the direction of rotation of the shaft 22, all in a conventional manner of reversing in a transmission gearing.

A second reduction gear 51 is mounted on the shaft 22 to rotate with the latter, and the gear 51 engages a larger gear 52 which is journaled over the shaft 29, but which is rotatable with a gear 53 which in turn is rotatable on the shaft 29. Thus, bushings or bearings 54 are disposed between the one end of the shaft 29 and the hub of the gear 53 so that the latter along with the gear 52 is rotatable with respect to the shaft 29. It will also be noted that a spacer or the like 56 is disposed between the sleeve 28 and the gear 53 to keep them separated as desired, and also a washer or the like 57 is disposed between the gear 53 and the housing 10 at one end of the shaft 29 and another washer 57 is disposed between the sleeve 28 and the housing 10 at the other end of the shaft 29. With this arrangement, the gears 27, 36, and 37 constitute one cluster which is rotatable with respect to its supporting shaft 29, while the gears 52 and 53 constitute another cluster which is rotatable with respect to the shaft 29, and the two gear clusters are rotatable separately and independently from each other, and they are a first and second gear set, separate from each other so they are both supported on the common shaft 29.

Figure 2:
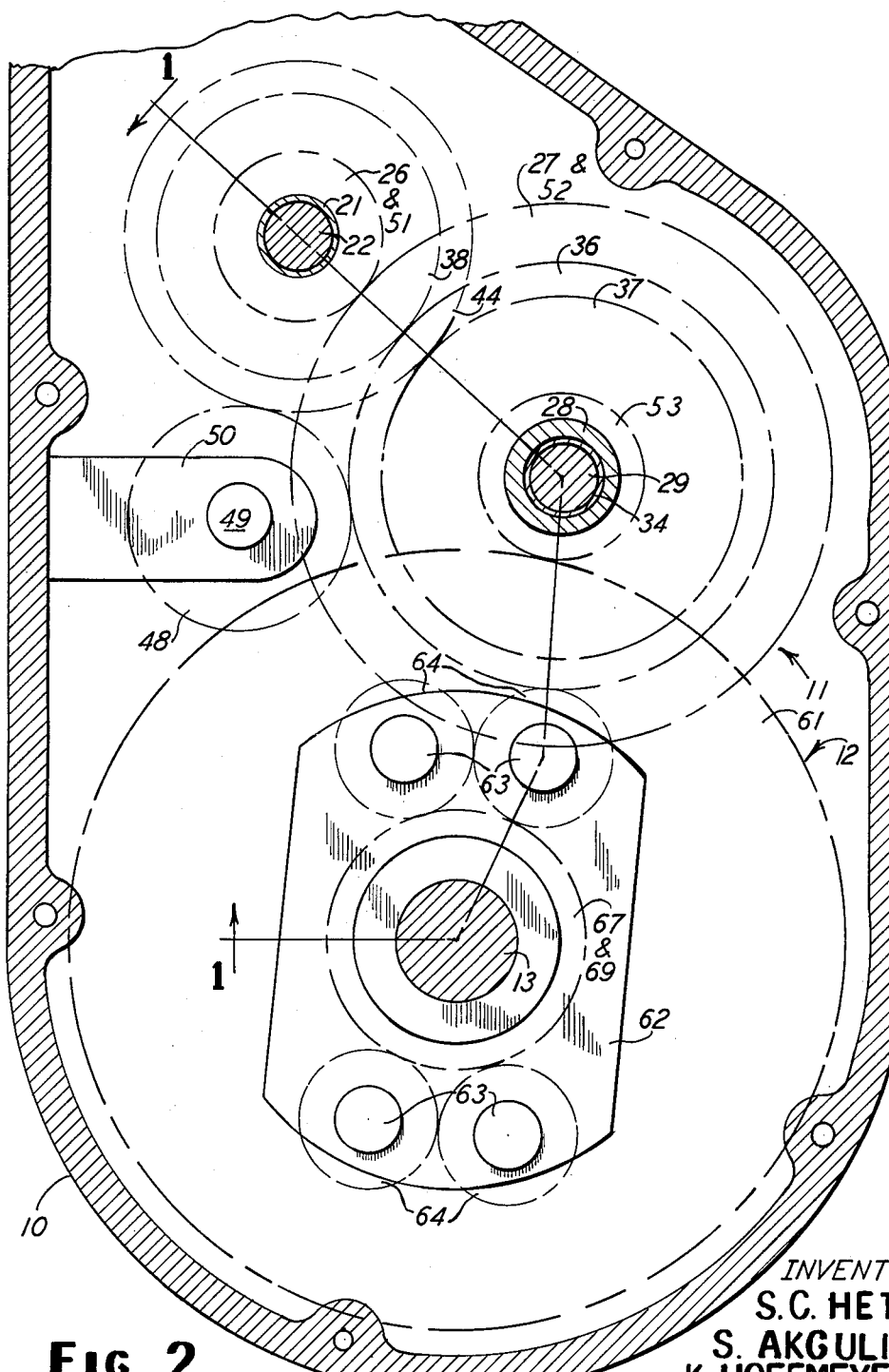
FIG. 2 is a sectional view taken along the line 2—2 of FIG. 1.

The differential 12 is of a conventional construction of the standard differential spur gear type and here the differential includes a differential spider gear or ring gear 61 which is engaged with the gear 53 and which is rotatably mounted on the axles 13 and 14 as the gear 61 has a housing 62 extended therefrom to carry four shafts 63 as shown in FIG. 2. A differential pinion 64 is rotatably mounted on each of the four shafts 63, and a spacer 66 is also mounted on each of the shafts 63 to keep the pinions 64 disposed to one side as shown in FIG. 1. Thus, of course the gear 61 and its housing 62 and the four shafts 63 with their gears 64 all rotate together about the axis of the axles 13 and 14 which are of course co-axial. A differential gear 67 is mounted on the axle 13 by means of a key 68 such that the gear 67 and the axle 13 are rotatable together, and similarly, the differential gear 69 is mounted on the axle 14 by means of a key 71. The differential gears 67 and 69 respectively engage the pinions 64 so that the latter induce rotation to the differential gears 67 and 69 as desired in the conventional manner of operating the vehicle differential. Here it will also be understood as shown in both FIGS. 1 and 2, the gears 64 are paired together and they are meshed together as they overlap along their inner ends of their staggered or offset relation so that the desired rotation of the gear 61 will be transmitted to the differential gears 67 and 69. Since this is of a conventional differential construction, no further description thereof is necessary for an understanding of this structure.

While a specific embodiment of this invention has been shown and described, it will be understood that certain changes could be made therein and the invention therefore should be limited only by the scope of the appended claims.

What is claimed is:

1. A variable speed transmission comprising a housing, a first shaft rotatably mounted in said housing, at least two shift gears axially shiftably mounted on said first shaft and being rotatable therewith, an additional gear mounted on said first shaft and being rotatable therewith, a second shaft nonrotatably mounted in said housing and being rigidly attached to the latter for support, a first gear set of at least two gears rotatably mounted on said second shaft for selective and separate engagement with respective ones of said shift gears, input drive means engaged with said first gear set for rotating the latter on said second shaft, a second gear set rotatably mounted on said second shaft for rotation thereon independent of the rotation of said first gear set and being in constant driving relation with said additional gear on said first shaft, and an output drive gear being included in said second gear set.

2. A combined variable speed transmission and differential comprising a housing, a first shaft rotatably mounted in said housing, shift gears axially movably mounted on said first shaft and being rotatable therewith, a second shaft non-rotatably and rigidly mounted in said housing to serve as a structural member therein, a first set of gears rotatably mounted together on said second shaft for rotation together as a unit and for selective engagement with said shift gears, a second set of gears rotatably mounted together on said second shaft to be rotatable as a unit and independent of said first set of gears, an additional gear mounted on said first shaft for rotation therewith and being constantly and directly meshed with said second set of gears, two axles rotatably extending into said housing, a differential spider gear rotatably mounted on said axles and disposed in said housing and being constantly and directly meshed with said second set of gears, pinions rotatably mounted on said differential spider gear for displacement with the rotation of said differential spider gear, and a differential gear on each of said axles and being separately engaged with different ones of said pinions for rotation of said axles through said transmission and differential.

3. A variable speed transmission comprising a housing, a first shaft rotatably mounted in said housing, a shift gear axially shiftably mounted on said first shaft and being rotatable therewith, an additional gear mounted on said first shaft and being rotatable therewith, a second shaft non-rotatably mounted in said housing, a first gear rotatably mounted on said second shaft for selective engagement with said shift gear, input drive means rotatably mounted on said housing and being in driving relation with said first gear for rotating the latter on said second shaft, a second gear rotatably mounted on said second shaft for rotation thereon independent of the rotation of said first gear and being in constant driven relation with said additional gear on said first shaft, and an output drive means rotatably mounted on said housing and being in driven relation with said second gear.

4. A variable speed transmission comprising a housing, a first shaft rotatably mounted in said housing, at least two shift gears axially shiftably mounted on said first shaft and being rotatable therewith, an additional gear mounted on said first shaft and being rotatable therewith, a second shaft nonrotatably mounted in said housing, a sleeve rotatably mounted on said second shaft and extending over a first portion thereof, a first gear set of at least two gears mounted on said sleeve and being rotatable therewith for selective and separate engagement of the latter said gears with respective ones of said shift gears, input drive means constantly engaged with said first gear set for rotating the latter on said second shaft, a second gear set rotatably mounted on a second portion of said second shaft for rotation thereon independent of the rotation of said first gear set and being in driven relation with said additional gear on said first shaft, and an output drive gear being included in said second gear set.

5. A variable speed transmission comprising a housing, a first shaft rotatably mounted in said housing and having one end extending therefrom, two shift gears axially shiftably mounted on said first shaft and being rotatable therewith, an additional gear mounted on said first shaft and being rotatable therewith, a second shaft non-rotatably and rigidly mounted in said housing for supporting same, a first gear set of two gears rotatably mounted on said second shaft for selective and separate engagement of the latter said two gears with respective ones of said shift gears, a third shaft mounted in said housing, a reversing gear mounted on said third shaft and being in driven relation with one of said two gears and being within the shifting displacement of one of said shift gears for selective engagement therewith, input drive means on said one end of said first shaft and being rotatable thereon and in constant driving relation with said first gear set for rotating the latter on said second shaft, a second gear set of two gears rotatably mounted on said second shaft for rotation thereon independent of the rotation of said first gear set and with one of said two gears of said second gear set being in constant driven relation with said additional gear on said first shaft, and the other one of said two gears of said second gear set constituting an output drive gear of said transmission.

References Cited in the file of this patent

UNITED STATES PATENTS 1,323,501   Thomas ---------------- Dec. 2, 1919